H. E. MONTAGUE.
INTERNAL COMBUSTION ENGINE.
APPLICATION FILED SEPT. 29, 1916.
1,227,551. Patented May 22, 1917.
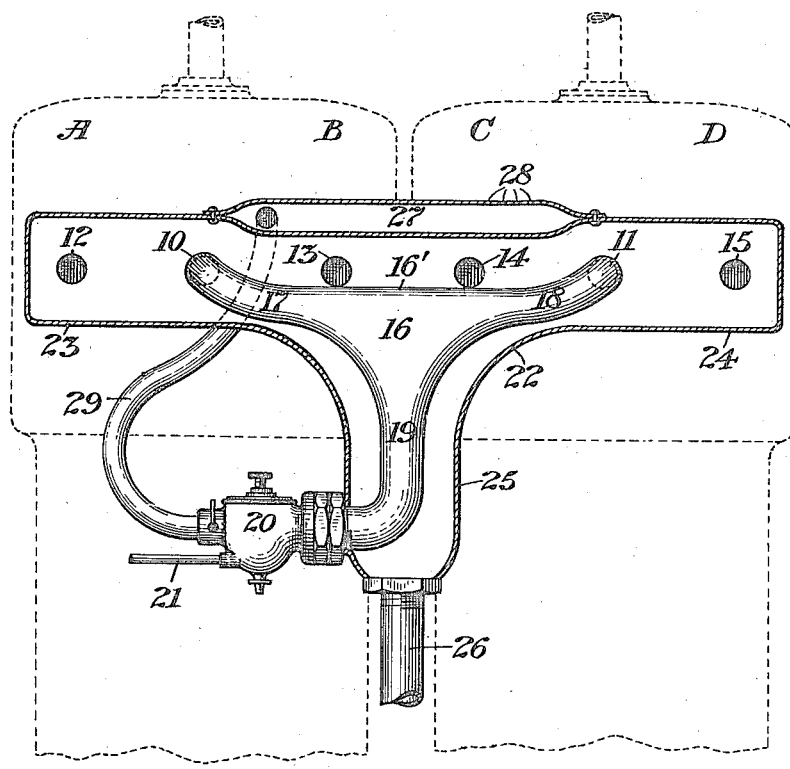
WITNESS
Chas. F. Clagett
INVENTOR
Harold Edgar Montague
BY
Serrell Son
HIS ATTORNEYS

UNITED STATES PATENT OFFICE.

HAROLD EDGAR MONTAGUE, OF PHILADELPHIA, PENNSYLVANIA, ASSIGNOR OF FIFTY-FIVE ONE-HUNDREDTHS TO DAVID KRAUS, OF NEW YORK, N. Y.

INTERNAL-COMBUSTION ENGINE.

1,227,551.  Specification of Letters Patent.  Patented May 22, 1917.

Application filed September 29, 1916. Serial No. 122,811.

*To all whom it may concern:*

Be it known that I, HAROLD E. MONTAGUE, a citizen of the United States, residing at Philadelphia, in the county of Philadelphia and State of Pennsylvania, have invented an Improvement in Internal-Combustion Engines, of which the following is a specification.

My invention relates to internal combustion engines, and more particularly to the construction and arrangement of the manifold devices, both for the intake and the exhaust, employed in connection therewith.

In the present day gas engine practice, due to incompletely gasifying the liquid fuel and the consequent incomplete combustion, difficulties have been experienced with carbon deposits in the explosion chambers, imperfect lubrication in the cylinders, and smoke in the exhaust. The object of my present invention is to overcome these difficulties, and in carrying out the same in order to completely gasify the liquid fuel, I utilize the heat in the exhaust gases by completely inclosing the intake manifold in the exhaust manifold, and it has been found by actual use of the apparatus hereinafter described, that the fuel is so heated as to be cracked or transformed into a fixed gas at a temperature approximating 1000° F., the transformation being effected irrespective of whether high or low grade fuels are employed, and the same is the case, even when the fuel contains a certain percentage of water. As will be readily appreciated by feeding a fixed perfectly dry and absolute gas to the engine cylinders the combustion of the same when compressed and fired, is substantially complete and therefore overcomes the trouble with carbon deposits in the combustion chambers, with lubricating the cylinders, and also with smoke in the exhaust. The manifold structure made in accordance with my invention will be hereinafter more particularly described, in conjunction with the accompanying drawing, which is a diagrammatic sectional elevation illustrating the same.

Referring to the drawing, the cylinders of the gas engine are illustrated respectively at A, B, C, and D, and are constructed in pairs as commonly done at the present time. The fuel inlet to the cylinders A and B is indicated at 10, and the fuel inlet to the cylinders C and D at 11, the exhaust from the cylinder A at 12, the exhaust from the cylinder B at 13, the exhaust from the cylinder C at 14, and the exhaust from the cylinder D at 15.

The intake manifold is indicated at 16, and as is customary, is provided with branches 17 and 18 leading respectively to the intake 10 of the cylinders A, B, and the inlet 11 of the cylinders C, D. The top wall $16^1$ of the manifold is straight and relatively flat and hence acts to spread or divide the fuel and thus facilitate the heating thereof. The intake manifold also includes a downward extension 19 at the extremity of which a carbureter 20 is suitably attached, the carbureter being provided with a pipe 21 supplying the same with liquid fuel from any suitable source of supply. I also employ an exhaust manifold 22, which completely surrounds or incloses the intake manifold 16. The exhaust manifold 22 is also provided with branches 23 and 24 respectively, the former surrounding the branch 17 of the intake manifold and extending sufficiently far to embrace the exhaust port 12 of the cylinder A, while the branch 24 surrounds the branch 18 of the intake manifold and extends sufficiently far to embrace the exhaust port 15 of the cylinder D. It will be noted that when in their assembled positions, the top of the intake manifold 16 is immediately beneath the exhaust ports 13 and 14 of the cylinders B and C. The exhaust manifold also includes the downward extension 25 inclosing the extension 19 of the intake manifold which passes through an opening provided therefor adjacent the extremity of the extension 25, so that the carbureter may be connected exteriorly of the exhaust manifold. The aperture in the exhaust manifold through which the extension 19 passes, is substantially at the end of the extension 25 so that the inlet to the intake manifold is adjacent to the exhaust or discharge 26 of the exhaust manifold. The exhaust manifold is also provided with a hot air chamber 27 preferably constructed in the top thereof with the upper wall having series of apertures 28 to admit the air. These apertures 28 are preferably at one end of the air chamber while at the other end provision is made for connecting one end of a hot air pipe 29 which at its opposite end communicates with the inlet side of the carbureter.

From the foregoing description it will be apparent that the entire heat of the exhaust gases by causing them to pass around the intake manifold in traveling from the exhaust ports to the discharge of the exhaust manifold, is utilized in heating the intake manifold, and completely gasifying the liquid fuel supplied to the intake manifold before the same reaches the engine cylinders for use therein in driving the engine and as the fuel supplied the cylinders is only a dry fixed gas, unmixed with any of the liquid fuel, the combustion in the engine is practically complete and results in no carbon deposits, making it possible to perfectly lubricate the engine pistons and also obviates any smoke in the exhaust gases.

I claim as my invention:

1. The combination of an internal combustion engine, a carbureter, and a heat transformer, the heat transformer being so constructed as to raise the temperature of the carbureted air to the cracking point.

2. The combination of an internal combustion engine, a carbureter, and a heat transformer, the heat transformer being so constructed as to raise the temperature of the carbureted air to the cracking point, which is accomplished at approximately a temperature of 1000 degrees Fahrenheit.

3. In an internal combustion engine and in combination with the cylinders thereof, a carbureter, a heater for the mixture produced in said carbureter, said heater consisting of an elongated chamber communicating with the carbureter and inclosed within the exhaust compartment and means to discharge the exhaust gases from the engine into said compartment at a plurality of ports distributed along the chamber.

4. In an internal combustion engine and in combination with the cylinders thereof, an intake manifold having branches connected to the inlet ports of the cylinders and a downward extension, an exhaust manifold having branches surrounding the said branches of the intake manifold and embracing the discharge ports of the said cylinders and also a downward extension surrounding the downward extension of the intake manifold and terminating in a discharge adjacent the inlet to the downward extension of the intake manifold, a carbureter connected to the extension of the intake manifold exteriorly of the extension of the exhaust manifold, a fuel feed pipe for the carbureter, a hot air chamber in the upper portion of the exhaust manifold, and a connection between the hot air chamber and the inlet side of the carbureter.

Signed by me this 25th day of September, 1916.

HAROLD EDGAR MONTAGUE.